E. E. SWEET.
MOTOR VEHICLE.
APPLICATION FILED NOV. 20, 1916.
1,349,589.
Patented Aug. 17, 1920.
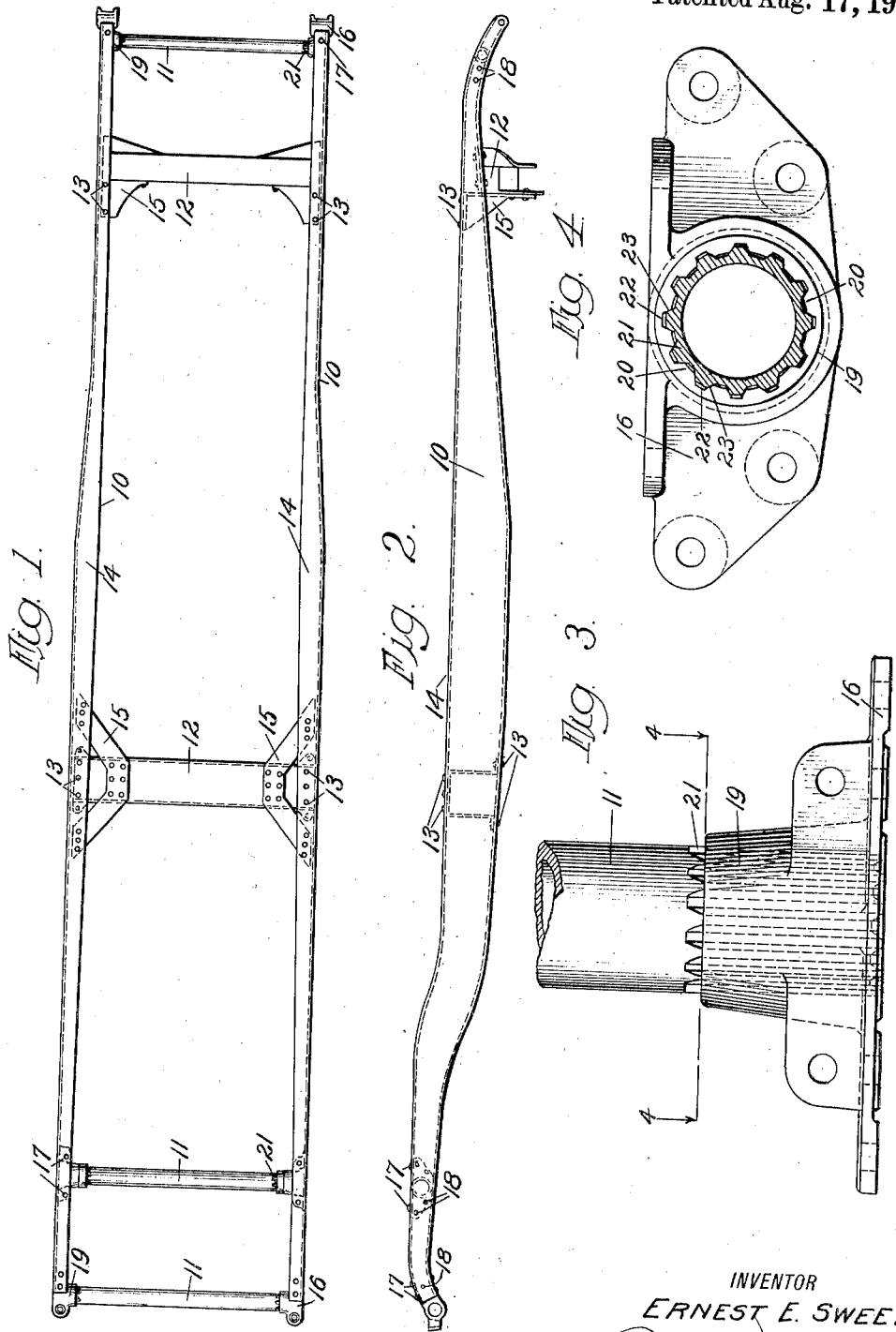
INVENTOR
ERNEST E. SWEET
BY
ATTORNEY

UNITED STATES PATENT OFFICE.

ERNEST E. SWEET, OF DETROIT, MICHIGAN, ASSIGNOR TO CADILLAC MOTOR CAR COMPANY, OF DETROIT, MICHIGAN, A CORPORATION OF MICHIGAN.

MOTOR-VEHICLE.

1,349,589.

Specification of Letters Patent. Patented Aug. 17, 1920.

Application filed November 20, 1916. Serial No. 132,328.

*To all whom it may concern:*

Be it known that I, ERNEST E. SWEET, a citizen of the United States, and resident of Detroit, Wayne county, State of Michigan, have invented certain new and useful Improvements in Motor-Vehicles, of which the following is a specification.

This invention relates to motor vehicles, and particularly to frame constructions especially adapted for use therein.

One of the objects of this invention is to provide a frame construction having maximum strength with a minimum of weight. A difficulty frequently experienced with the use of previous frame constructions is the proper distribution of the lifting strains on one frame side member to the other one without causing undesirable twisting and distortion of the various connections. In previous frame constructions where one portion, such as the end of a frame side member, remains in a relatively stationary position and another end is subjected to a lifting strain, it has been found that there is a tendency for a relatively rocking movement between the frame side members and the connecting member adjacent the relatively stationary portions of the side members. Therefore one of the salient objects of this invention is to provide a satisfactory and efficient frame construction wherein the relative rocking movements of the frame side members are reduced to a minimum.

These and other objects will clearly appear from the following description, taken in connection with the accompanying drawings which form a part of this specification, and in which:

Figure 1 illustrates a plan view of a motor vehicle frame constructed according to this invention;

Fig. 2 is a side elevation of my frame;

Fig. 3 illustrates a preferred connection between frame side and transverse members; and Fig. 4 is a transverse vertical section along the line 4—4 of Fig. 3.

Referring to the drawings, 10 are parallel frame side members of channel section, between which are arranged tubular and channel transverse members 11 and 12, respectively. The angle members 12 may be suitably secured at their opposite ends as by rivets 13 to the flange portion 14 of the side members 10. Gusset members or plates 15 may be also suitably riveted to the members 12 and 10, respectively, for forming bracing members. The opposite ends of the tubular members 11 are suitably clutched to the frame side members in such a manner as to properly resist any relative rocking action between the frame side members 10 on said tubular members 11. Each of these clutch connections comprises a bracket 16 secured as by rivets 17 and 18 to the flanged and webbed portions of the side members 10. The bracket 16 is provided with a boss 19 having an internally-splined portion 20. The opposite ends of the tubular members 11 are formed with externally-splined portions 21 which are adapted to have a pressed fit with a pair of oppositely disposed internally-splined bosses 19. It will be noted that a suitable clearance 22 is provided between the bottom of the external spline and the top of the internal spline, and vice versa, so that all tortional strains are resisted by the angular surfaces 23 of the splines.

It will be noted from the foregoing that any tendency to rock one frame side member 10 relatively to the opposite side members on one of the tubular cross members 11, will be fully and adequately communicated through the splined connections 20 and 21 to the opposite frame members; and that the splines are provided with clearances between certain complementary portions to prevent resisting the tortional action by means of friction, all tortional stresses being taken up by curved or angular abutments.

While I have described and will specifically claim what I deem to be a preferred embodiment of my invention, it will be obvious to those skilled in the art that various changes and modifications may be made without departing from the spirit and scope thereof.

Having thus described my invention, what I claim and desire to secure by Letters Patent is:

1. In combination, two oppositely located side frame members spaced apart from one another; a connecting member extending between and the ends of which are rigidly secured to said frame members; a non-distortion member independent of said connecting member and extending between said frame members; and means intermediate each frame member and the adjacent end of said non-distortion member for transmitting twisting stresses to said non-distortion member, as the position of one of said frame members is varied relative to the other.

2. The combination with a pair of vehicle frame side members, each provided with an internally-splined boss, of a transverse non-distortion member provided with externally-splined portions at its opposite ends which are adapted to be fitted into said bosses.

3. The combination with vehicle frame side members, and a plurality of non-distortion transverse members, of means for securing said side members to said non-distortion members comprising splined connections between the opposite ends of said transverse members and said side members, respectively.

4. The combination with a pair of vehicle channel frame side members, of tubular non-distortion transverse members arranged therebetween, and splined means for connecting said side members to said non-distortion transverse members.

5. The combination with a tubular member provided throughout its circumference with an internally-splined portion, of a complementary externally-splined member, each of said splines being wedge shaped and so formed that suitable clearances are provided between the circumferential surfaces of the internal and external splines of the members.

6. The combination with a pair of vehicle frame side members, of a plurality of angle irons connecting said side members, a plurality of tubular members between said side members, and splined connections between opposite ends of said tubular members and said side members, respectively.

7. The combination with a frame side member and a tubular cross member, said side member having an internally splined portion, said cross member having a complementary externally splined portion, said portions being so formed that suitable clearances are provided between concentric splined surfaces of the internal and external splines of the members.

In testimony whereof I affix my signature.

ERNEST E. SWEET.